United States Patent
Bost (10) Patent No.: US 9,388,554 B2
(45) Date of Patent: Jul. 12, 2016

(54) FIRE HYDRANT PRESSURE INDICATOR

(71) Applicant: Keith Allen Bost, Greenville, SC (US)

(72) Inventor: Keith Allen Bost, Greenville, SC (US)

( * ) Notice: Subject to any disclaimer, the term of this patent is extended or adjusted under 35 U.S.C. 154(b) by 191 days.

(21) Appl. No.: 14/205,655

(22) Filed: Mar. 12, 2014

(65) Prior Publication Data

US 2014/0261731 A1    Sep. 18, 2014

Related U.S. Application Data

(60) Provisional application No. 61/779,961, filed on Mar. 13, 2013.

(51) Int. Cl.
*E03B 9/06* (2006.01)
*E03B 9/02* (2006.01)
*F16K 27/00* (2006.01)
*F16K 27/12* (2006.01)

(52) U.S. Cl.
CPC .................. *E03B 9/02* (2013.01); *F16K 27/006* (2013.01); *F16K 27/12* (2013.01); *Y10T 137/0402* (2015.04); *Y10T 137/5456* (2015.04); *Y10T 137/5468* (2015.04)

(58) Field of Classification Search
CPC ............... E03B 9/02; E03B 9/04; E03B 9/06; F16K 27/006; F16K 27/12
USPC ........ 116/200, 209, 264; 137/15.01, 294, 296
See application file for complete search history.

(56) References Cited

U.S. PATENT DOCUMENTS

| | | | | |
|---|---|---|---|---|
| 2,059,009 A | * | 10/1936 | McCarthy | E03B 9/02 116/200 |
| 2,175,565 A | * | 10/1939 | Blackman | E03B 9/02 137/272 |
| 3,294,109 A | * | 12/1966 | Smith | E03B 9/04 137/298 |
| 3,331,397 A | | 7/1967 | Mueller et al. | |
| 3,623,498 A | * | 11/1971 | Manahan | E03B 9/06 137/296 |
| 4,033,372 A | * | 7/1977 | Bowman | E03B 9/06 137/296 |
| 4,398,556 A | | 8/1983 | Pereira et al. | |
| 4,633,896 A | * | 1/1987 | Bainbridge et al. | E03B 9/02 137/296 |
| 4,727,900 A | * | 3/1988 | Dooling et al. | E03B 9/06 137/296 |
| 4,825,898 A | | 5/1989 | Vis | |
| 4,827,969 A | | 5/1989 | Lyasko | |
| 5,029,550 A | * | 7/1991 | Hopper, Sr. et al. | G09F 3/00 116/209 |
| 5,469,724 A | * | 11/1995 | Pollard | E03B 9/06 137/296 |
| 5,549,133 A | * | 8/1996 | Sigelakis | E03B 9/06 137/296 |
| 6,260,507 B1 | * | 7/2001 | Simpson et al. | E03B 9/06 116/200 |
| 6,463,953 B1 | * | 10/2002 | Cuzzo et al. | E03B 9/06 137/296 |
| 6,536,462 B1 | | 3/2003 | Laugen | |
| 6,758,160 B1 | * | 7/2004 | Martin | E03B 9/06 116/201 |
| 8,614,745 B1 | * | 12/2013 | Al Azemi | H04N 7/183 348/159 |
| 2009/0128355 A1 | | 5/2009 | Urbin | |
| 2012/0261002 A1 | | 10/2012 | Sampson | |

* cited by examiner

*Primary Examiner* — R. A. Smith
(74) *Attorney, Agent, or Firm* — McNair Law Firm, P.A.; Douglas L. Lineberry (57) ABSTRACT

Devices, systems and methods for visually indicating the presence of a fire hydrant and the range of gallons per minute water flow associated with the hydrant by using a single-piece fire hydrant cover.

20 Claims, 7 Drawing Sheets

FIRE HYDRANT PRESSURE INDICATOR

This application claims priority to provisional application 61/779,961 filed Mar. 13, 2013, which is incorporated herein by reference. Further, Applicant notes that co-pending application Ser. No. 14/205,599 was filed Mar. 12, 2014.

BACKGROUND

Fire hydrants are widespread throughout communities, cities, industrial facilities, etc. While seeming immutable and ever present, hydrants require significant upkeep and testing on a continuous basis. This consumes already tight budgetary resources for fire departments, as well as diverts man-hours to locating and maintaining the hydrants on, at least, a semi-annual basis.

The National Fire Protection Association (NFPA) establishes standards for hydrant testing and maintenance. For instance, NFPA Standard 291 relates to flow testing and marking of fire hydrants. Marking of hydrants is typically accomplished by painting the hydrant cap or bonnet, or whatever term the local fire department associates with the uppermost part of the hydrant, a particular color in order to clearly identify the flow capabilities of each hydrant. NFPA Standard 291 lists the following colors: Class AAA—light blue—1500 Gallons Per Minute (GPM) or higher; Class A—green—1,000 to 1,499 GPM; Class B—Orange—500 to 999 GPM; Class C—red—less than 500 GPM.

Typically, at least twice each year, fire departments conduct flow tests on hydrants to test the hydrants' flow capabilities. Moreover, additional testing becomes necessary if water consuming structures or flow associated with the water flow system changes. For instance, addition of elevated water tanks, addition of more water lines, removal of same, or any other change that could increase or decrease the flow rates of the hydrants associated with that portion of the water flow system, necessitates testing the flow capabilities of the hydrants associated with the impacted portion of the system.

Moreover, hydrant flow also impacts the general public. For instance, flow ratings impact homeowners insurance via the Insurance Service Office (ISO) standard. The standard is used by fire departments throughout the United States of America to rate each fire department in the United States. Homeowners insurance is largely affected by the resources of the local fire department. The ISO standard rates fire departments on a class method with the best fire departments receiving an ISO Class I rating and the worst rating being an ISO Class 10. For example, a fire department with an ISO Class 10 rating, the worst rating, by improving its score to an ISO Class 6 rating, may reduce homeowner's insurance up to forty percent. In order to determine the rating and attempt to improve same, multiple steps must be met, including semi-annual testing as well as annual maintenance of the hydrants. These standards ensure that sound maintenance programs are in place while also ensuring that hydrants will work when a fire is present and water is needed.

Further, all structures have what is known as a "Needed Fire Flow" (NFF) amount. This is the amount of water required to put out a home or business, if it is on fire. For example, a typical 2,000 square foot home has a NFF of about 650-666 GPM. Marking hydrants allows for the fire crew responding to a fire emergency to identify the amount of water that a hydrant can produce simply by looking at the hydrant. For instance, a fire crew responding to a fire involving a 2,000 square foot home would know upon looking at a painted hydrant whether it produced sufficient GPM to quench the fire based on the color coding painted on the hydrant.

Marking fire hydrants to help locate them as well as to indicate their respective GPM rates is time-consuming and dangerous with respect to the fire department personnel testing and marking the hydrants. Most fire hydrants are located immediately beside roadways and streets in the fire district. Thus, hydrant marking typically employs at least two personnel. One to paint or mark the hydrant and one to watch for traffic. Painting each hydrant takes several minutes per hydrant. Additionally, the more a hydrant has been painted in the past, the more likely it is for the painter to need to remove previous paint layers in order to achieve good adhesion with the current paint. This increases the amount of time needed for maintaining the hydrant, as well as keeps the fire personnel in close proximity to the roadway and possible harm.

Further, the expense associated with marking, remarking and grading the hydrants quickly escalates as one must account for not only the time value of money for involving multiple fire personnel to paint a hydrant, the cost of fuel to arrive at same, and the supply expenses associated with painting the hydrants. These amounts are further compounded by large fire districts with a large number of hydrants.

Various prior attempts have been made to provide covers for fire hydrants. These include attempts such as U.S. Pat. No. 4,827,969 to Lyasko wherein the entirety of the fire hydrant is covered. U.S. Pat. No. 4,825,898 to Vis, meanwhile, discloses a protective device for fire hydrants shaped to receive an operating nut in order to prevent tampering via readily available pliers, wrenches and the like. The invention is intended to be retrofitted to existing fire hydrants via welding or brazing. U.S. Pat. No. 4,398,556 to Pereira, et al., discloses a cup shaped cover for a fire hydrant that includes an opening therethrough for rotatably receiving a special tool that opens and closes the fire hydrant valve while also allowing for escape of water and debris that may accumulate on top of the hydrant. U.S. Pat. Pub. No. 2012/0261002 to Sampson discloses a multi-purpose reflective collar for attaching to a hydrant for increasing visibility and indicating the hydrant's flow rate. Color coded reflective tape webs can be removably attached to the collar to accomplish these goals. The collar is made to be adjustable in order to fit hydrants of differing sizes, as may be found from one fire district to another. The collar is synched around an outer extremity of the hydrant while leaving the top of the hydrant uncovered. U.S. Pat. Pub. No. 2009/0128355 to Urbin discloses a collar for visibly marking a fire hydrant including a ring-shaped body portion and light emitting means along with a photovoltaic device. However, these attempts leave much to be desired with respect to an efficient, functional, low cost, easily reproducible, and quickly deployed marking device that clearly indicates the flow associated with a hydrant as well as helps fire personnel visually locate the hydrant in times of need.

What is needed in the art are quickly and easily deployed, quickly and easily replaceable and/or interchangeble low cost devices and methods for marking a fire hydrant with its respective GPM rating as well as helping to make the hydrant more visible, and thereby more accessible, to fire personnel.

SUMMARY

Objects and advantages of the invention will be set forth in the following description, or may be obvious from the description, or may be learned through practice of the invention. It is intended that the invention include modifications and variations to the system and method embodiments described herein.

The present invention provides a fire hydrant marking device, a variable marking system, and methods for visually indicating the presence of, and gallons per minute flow pressure associated with, a fire hydrant. In a particular embodiment, a fire hydrant marking device is provided. The device may include a collar for interfacing with a fire hydrant, wherein the collar encircles the hydrant. A cap extends from the collar and may directly engage or lie outward from an upper portion of the fire hydrant. The cap is removably engaged with an engagement surface of the collar. The collar may be reflective. In one embodiment, the cap comprises a single color. In a further embodiment, the cap may further include a top end that defines an opening and at least one side, at least partially covering a bonnet of a fire hydrant. The cap may also be locked to the collar via a locking mechanism. In one embodiment, the cap may define at least one opening in addition to the opening defined in the top end. In a further embodiment, the cap comprises a single color and different caps may possess different colors. Still further, the collar may be reflectively marked or colored with a color not associated with the cap.

In another embodiment, a variable marking system is provided. The system includes an anchor for interfacing with a substantially columnar device. The anchor at least partially encircles the substantially columnar device. A colored indicator extends from the anchor and may be removably engaged with the anchor. The anchor may also be reflective and the colored indicator may comprise a single color. In a further embodiment, the colored indicator may further include a substantially curved surface defining at least one upper opening and may include at least one curved side extending toward the at least one upper opening. The colored indicator may be locked to the anchor via a locking mechanism. Further, the colored indicator may contain at least one opening defined in the at least one curved side in addition to the upper opening. The colored may comprise a single color with different colored indicators comprising different colors.

In a still further embodiment, a method is provided for visually indicating the water pressure associated with a fire hydrant. A base element may be attached to a fire hydrant. A rating system is established wherein different colors are associated with different ranges, or flow rates, of gallons per minute flow values of fire hydrants. A colored marker is colored to display at least one of the colors associated with a particular gallons per minute flow value. The colored marker may be removably engaged with the base. The base element may be reflective and the colored marker may be lockably engaged to the base element via a locking mechanism. In a further embodiment, a first colored marker may be attached to the base element and then removed from the base element while the base element remains attached to the fire hydrant. Still further, a second colored marker may be removably affixed to the base element once the first colored marker has been removed.

In another embodiment, a fire hydrant marking device is provided for interfacing with a fire hydrant. The marking device includes a cover defining an exterior and an interior surface with the cover comprising a cover top and a cover wall. The cover top and cover wall are shaped so that the interior surface of the cover substantially encloses a hydrant cap of the fire hydrant. The cover wall may also be shaped so that the interior surface may extend over a junction between the hydrant cap and a barrel of the fire hydrant. The cover wall may also be shaped to terminate proximate to and below the junction and the cover may be releasably engaged with the fire hydrant.

In a further embodiment, a portion of the cover comprises a single color that indicates a water pressure associated with the fire hydrant. Still further, a portion of the cover may be free of the color associated with the cover. Also, a portion of the cover may reflect light. In a still further embodiment, the cover top defines at least one opening proximate a crown of the top. Further, the cover wall may comprises at least one extending member directed inward from the cover wall. The at least one extending member may be formed to allow the cover to slide over the hydrant cap and junction with the extending member located below the junction. The extending member may also rest below or engage an underside of the junction of the fire hydrant to hold the cover in engagement with the fire hydrant.

In a further embodiment, a method of visually indicating the water pressure associated with a fire hydrant is disclosed. A rating system is established wherein different colors are associated with different ranges of gallons per minute flow values of fire hydrants. A hydrant marker is formed and may comprise a cover top and a cover wall. At least a portion of the hydrant marker is colored to display at least one of the colors associated with a gallons per minute flow value. The hydrant cap and junction may be substantially enclosed by the hydrant marker. The cover wall of the hydrant marker may terminate proximate to an underside of the junction. The hydrant marker is releasably engaged with the fire hydrant.

In a further embodiment, releasable engagement may be accomplished with an extending member located on an interior of the cover wall. Engagement may also be accomplished via defining at least one engagement opening in the cover wall and inserting an engagement member through the at least one engagement opening. Still further, releasable engagement may be accomplished via applying an adhesive to an interior surface of the cover wall. In a further embodiment, the marker may be lockably engaged to the base element via a locking mechanism.

Still another embodiment discloses a marker for indicating fire hydrant water pressure. The marker includes a cover shell that comprises at least one opening and an indicator wall. The indicator wall may be shaped to form a hollow that at least partially covers a hydrant cap of a fire hydrant. The hollow may also be shaped to at least partially enclose and at least partially extend over a junction between the hydrant cap and a barrel of the fire hydrant. The indicator wall hollow may also be shaped so that the indicator wall extends below the junction and at least partially surrounds a portion of the fire hydrant barrel proximate the junction. The indicator wall may also be releasably secured to the fire hydrant. Still further, cover shell may include a single color that indicates a water pressure associated with the fire hydrant. Releasable securement may be accomplished with an extending member located on an interior of the indicator wall, it may also be accomplished via defining at least one engagement opening in the indicator wall and inserting an engagement member through the at least one engagement opening. In still another embodiment, releasable securement may be accomplished via applying an adhesive to an interior surface of the indicator wall.

Additional aspects of particular embodiments of the invention will be discussed below with reference to the appended figures.

BRIEF DESCRIPTION OF THE DRAWINGS

A full and enabling disclosure, including the best mode thereof, to one of ordinary skill in the art, is set forth more particularly in the remainder of the specification, including reference to the accompanying Figures, in which.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION

Reference will now be made in detail to various embodiments of the presently disclosed subject matter, one or more examples of which are set forth below. Each embodiment is provided by way of explanation, not limitation, of the subject matter. In fact, it will be apparent to those skilled in the art that various modifications and variations may be made to the present disclosure without departing from the scope or spirit of the disclosure. For instance, features illustrated or described as part of one embodiment, may be used in another embodiment to yield a still further embodiment. Thus, it is intended that the present disclosure cover such modifications and variations as come within the scope of the appended claims and their equivalents.

In general, the present disclosure is directed to marking devices, variable marking systems, and methods for visually indicating the gallons per minute flow rate associated with a fire hydrant and visually locating same along a roadway or location.

Figure 1:
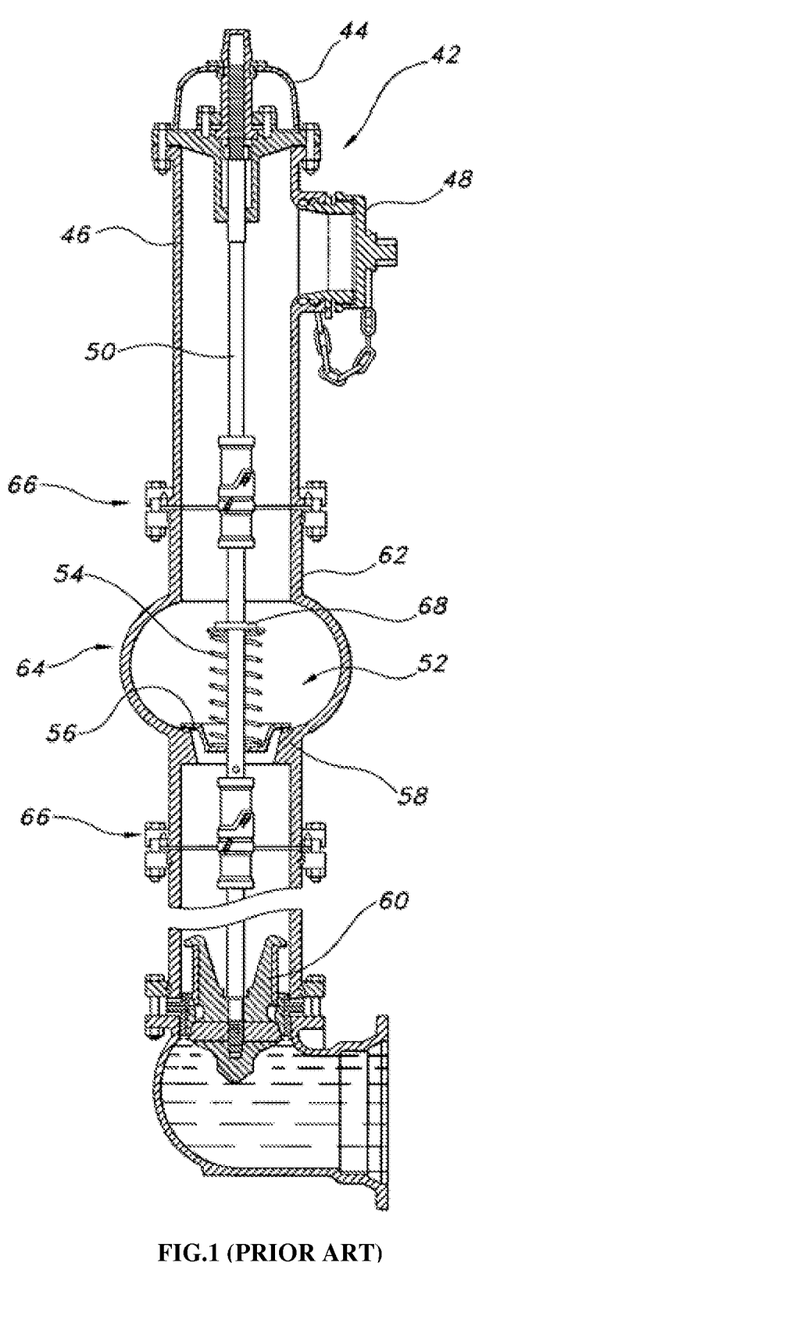
FIG. 1 is a cross sectional view of an example of a prior art fire hydrant.

FIG. 1 illustrates a cross sectional view of a prior art fire hydrant. The fire hydrant 42 shown in FIG. 1, may include a hydrant cap 44, a barrel 46, a nozzle 48, an actuator rod 50, a second valve 52 (including a biasing member 54, a restriction member 56 and a seat 58) and a first valve 60. Pin 68, or any other suitable structure, may facilitate positioning the restriction member 56 with respect to the actuator rod 50. Hydrant 42 may also include a secondary barrel insert 62. Secondary barrel insert 62 may include a portion 64 with an enlarged diameter. Portion 64 may be located relative to second valve 52 such that when second valve 52 is in an open condition, restriction member 56 is at least partially located within portion 64. The relatively large diameter of portion 64 may facilitate water flowing around restriction member 56, up though barrel 46 and out nozzle 48, when second valve 52, nozzle 48 and first valve 60 are all open. In some embodiments, portions of the inner surfaces of secondary barrel 62 may be coated with epoxy. Flanges 66 may facilitate retrofitting secondary barrel insert 62 into hydrant 42. In some embodiments, flanges 66 may be chosen from a variety of split flanges such that secondary barrel 62 may be used with various fire hydrants having various flange configurations. In other embodiments, secondary barrel insert 62 is integral to the hydrant 42 and therefore does not require flanges 66.

Figure 2:
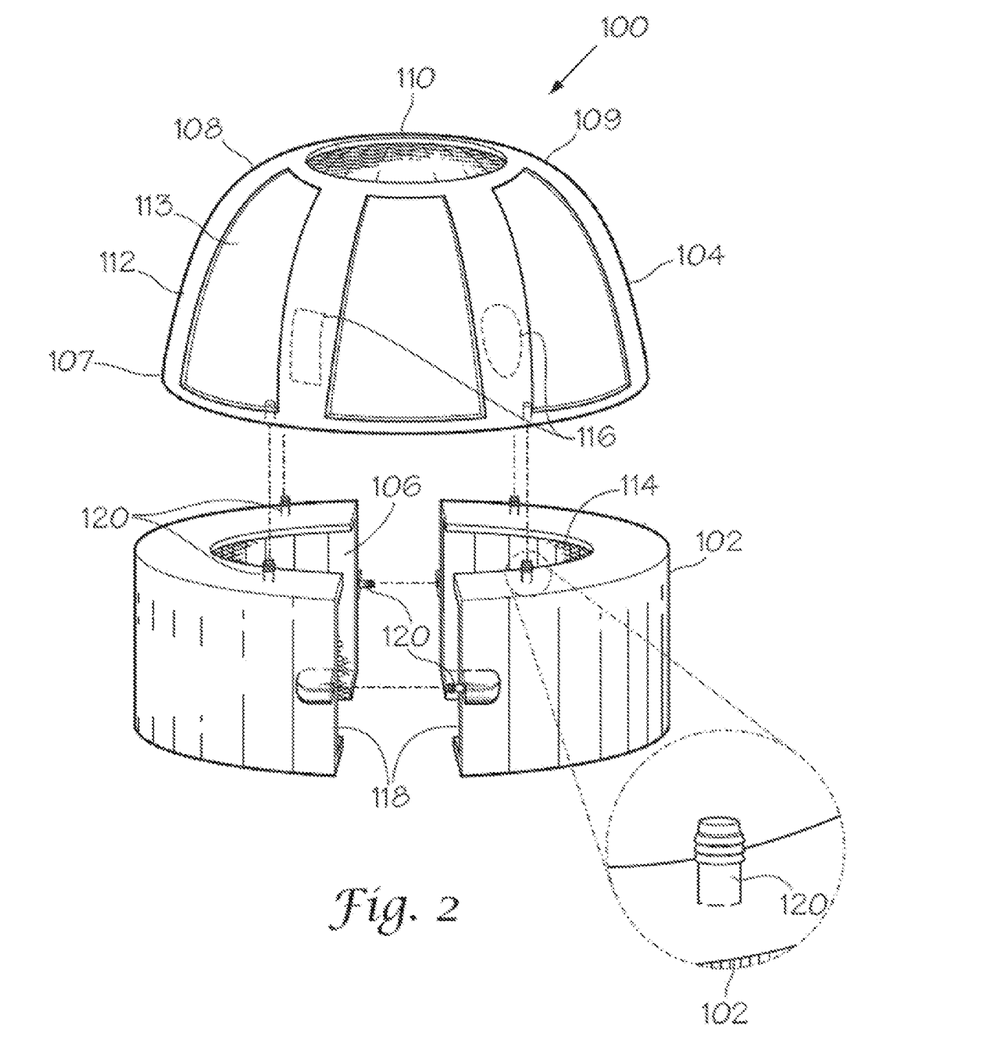
FIG. 2 is an exploded view of a marking device of the present disclosure.

FIG. 2 illustrates an exploded view of a marking device 100. Marking device 100 may be constructed from metals, plastics, composite materials, polymers, rubber, synthetics or any other material known to those of skill in the art. Most preferably, marking device 100 is constructed to be light weight, durable, and weather resistant. In a particularly preferred embodiment, marking device 100 is constructed from a polymer.

Marking device 100 may include a collar 102 and a cap 104. Preferably, the collar 102 and cap 104 may be made from the same material but may be made from different materials, including the materials set forth above. Collar 102 may be made to engage with cap 104. This engagement may be permanent, fixed, or releasable. Engagement may be accomplished via mating collar 102 with cap 104 via a particular geometry of engagement surface 106. This could include a male/female engagement or other means of coupling collar 102 to cap 104 as known to those of skill in the art. Engagement may be accomplished by, including but not limited to, hook type engagements, slot and twist engagements, bolting, barbed fixtures, etc. In other embodiments, adhesives, welding, bonding, etc., as known to those of skill in the art, may be used to engage the collar 102 and cap 104. Collar 102 and cap 104 may partially or fully encircle a portion of a fire hydrant.

In a most preferred embodiment, collar 102 is releasably engaged with cap 104 such that cap 104 may be removed or replaced while collar 102 remains in place. Collar 102 is preferably placed on a fire hydrant to at least partially encircle barrel 46. In a more preferred embodiment, collar 102 fully or completely encircles barrel 46 at junction 43 where barrel 46 and hydrant cap 44 are affixed to one another. In a further embodiment, collar 102 fully encircles barrel 46 at junction 43 and is located above nozzle 48, so that the lower portion of collar 102 remains above and/or does not extend downward sufficiently to interfere with gaining access to nozzle 48. In one preferred embodiment, the lowermost portion of collar 102 is located below junction 43 and above nozzle 48. Collar 102 may be sized such that its length encircles barrel 46, preferably at junction 43, and collar 102 is sized such that its width stops above, or rests upon, nozzle 48 without obstructing same.

Collar 102 may be shaped such that it defines at least one engaging opening at either its top 102A or bottom 102B that possesses a circumference that is narrower than the circumference of the portion surrounding junction 43. In one embodiment, both the top 102A and bottom 102B of collar 102 have smaller circumferences than the circumference of the portion of collar 102 surrounding junction 43, thus forming a structure similar to a plus sign with widened north and south pointing arms, or other similarly shaped structures, in order to prevent one from lifting collar 102 from hydrant 42 when cap 104 is removed. The two circumferences at the top and bottom may be the same circumference or different from one another, as long as they are sized to have a smaller circumference than the circumference of collar 102 at junction 43. In one embodiment, both top 102A and bottom 102B have a smaller circumference than that of the circumference of collar 102 surrounding junction 43. In a further embodiment, only bottom 102B has a circumference smaller than that surrounding junction 43.

Releasable engagement may be accomplished via mating geometries, a "tube and collar" arrangement wherein cap 104 fits within collar 102 and the two frictionally engage, the use of breakable or bendable engagement appendages 120, or other means as known to those of skill in the art. Engagement appendages 120 may extend from either collar 102 or cap 104 with cap 104 being preferred. Engagement appendages 120 may serve to secure collar 102 to cap 104 while allowing for later removal of cap 104 by severing, breaking, deforming, or otherwise changing the shape of engagement appendages 120 to allow cap 104 to be removed from collar 102 while maintaining the structural integrity of collar 102 to allow for fixation of the same or another cap 104.

Replacement of cap 104 may be necessary if a color associated with cap 104 becomes faded, cap 104 is damaged, or if the pressure associated with the fire hydrant, not shown, changes such that cap 104 no longer accurately displays the appropriate color code for the gallons per minute flow rate associated with the fire hydrant with which the collar 102 and cap 104 are engaged. Still further, collar 102 may be locked to cap 104 to guard against tampering or unauthorized personnel from removing cap 102 from collar 104. This may be accomplished via locking mechanism 114. Locking may be accomplished by having a device such as a lock pass through both collar 102 and cap 104. Locking may also be accomplished via the use of engagement appendages 120 as described above. Locking may also be achieved by the use of adhesives, mechanical engagement, male/female engagement, mating geometries, etc., as known to those of skill of the art.

Collar 102 may be generally circular in shape and formed to engage and affix to an outer surface of a fire hydrant, such as the fire hydrant ring or protrusion, such as junction 43, whereby the fire hydrant bonnet is attached to the columnar body of the hydrant. Having the collar engage or contact the fire hydrant ring enables the use of a minimum amount of material while providing for maximum visibility. Collar 102 may be designed to "snap onto" or otherwise engage or surround the fire hydrant ring or junction 43 as known to those of skill in the art. Collar 102 may be designed to be snug with the fire hydrant or may be designed to have some "play" with respect to engagement to allow water, debris, etc., that contacts collar 102 to pass through same and exit.

Figure 3:
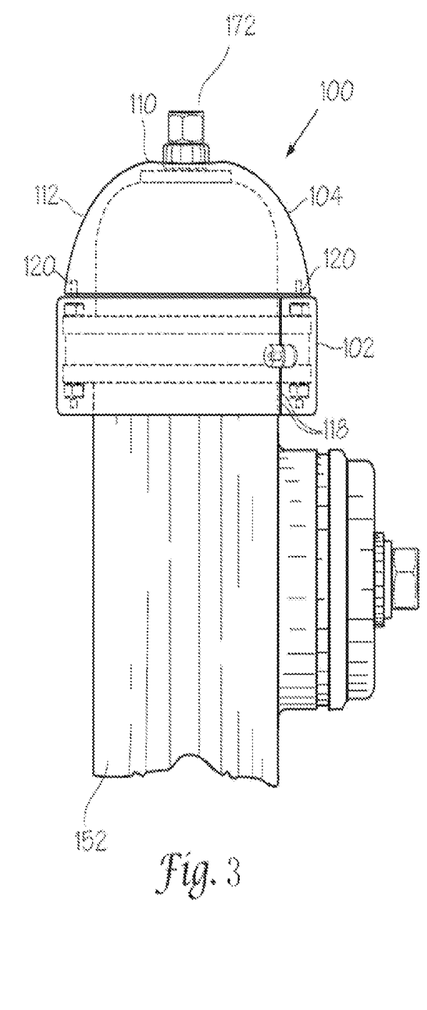
FIG. 3 is an engaged view of a marking device of the present disclosure.
Figure 4:
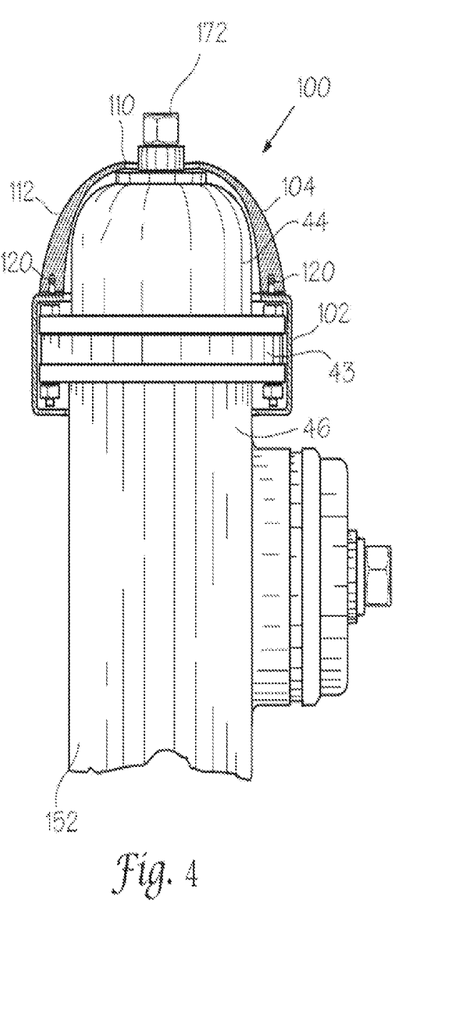
FIG. 4 is a cross sectional view of a marking device of the present disclosure engaged with a fire hydrant.

As FIG. 3 shows, separator sections 118 may divide collar 102 into at least two sections. While only two sections are shown, collar 102 may be divided into three, four, five, six or more sections and FIG. 3 should not be considered limiting. More sections may be necessary as determined by the circumference of the fire hydrant ring, or other surface of the hydrant, to which collar 102 may engage with a larger circumference requiring a collar with more separator sections 118 in order to surround and engage with the fire hydrant. Cap 104 may be of various sizes in order to accommodate a collar 102 that includes, two, three, four, six, etc., separator sections 118, thereby allowing for a "universal fit" system applicable to commercially available fire hydrants, even including variable sized "gypsy" or stand-alone hydrants of atypical circumference or size.

Cap 104 may be cone shaped, angular, such as a three, four, five, six, or more sided, solid in appearance, or formed to look like a curved or angular grid comprising cross sections and openings defined between same. In one embodiment, cap 104 is cone shaped defining an open lower end 104. Cap 104 may be generally conical in appearance with a curved side 112. Curved side 112 may be a solid piece or may form a shape such as a "grid," "caged," or "basket" appearance wherein extensions 109, defining gaps 113, extend from a lower portion 107 in order to form curved side 112 and top portion 108. Gaps 113 allow for less material usage and lower weight of the device while still maintaining good visibility of the hydrant and providing sufficient surface area to support a color or indicia indicating the fire hydrant flow rate. Further, gaps 113 serve to allow moisture, debris, or other detritus that encounter device 100 to be easily removed by wind, rain, or simply using one's fingers.

Lower portion 107 may be flanged outward, inward, or formed such that lower portion 107 is substantially in line with curved side 112 and/or extensions 109, thus not forming a substantial angle wherein extensions 109 diverge from lower portion 107. In other embodiments, lower portion 107 may engage curved side 112 at an angle ranging from 0 to 90 degrees, including, 0 to 45 degrees, 0 to 30 degrees, 0 to 15 degrees, 0 to 10 degrees, and 0 to 5 degrees, as well as specific degrees within these ranges. The angle may be formed to allow for better engagement between cap 104 and collar 102 or to allow for rain and debris to fall off the cap 104 rather than becoming entangled with same.

Top portion 108 may slope or curve inward to form a dome shape as well as to define an opening 110. Opening 110 is preferably sized to allow access to any nut, hardware, or other activating means located on the top of fire hydrant 42. Further, additional, various shaped openings 116 may be formed in curved side 112 or extensions 109 in order to further conserve materials or allow for better engagement with, or accommodation of, extensions on a particular type of fire hydrant 42.

Collar 102 may be reflective. This may include forming collar 102 from a reflective material such as a plastic, metal, or other material as described for forming device 100. Alternatively, collar 102 may be made from a polymer embedded or otherwise treated to render the polymer reflective. In another alternative, collar 102 may be coated with a reflective coating or reflective tape. Collar 102 may also be formed to luminesce to further enhance visibility, especially at night. In a preferred embodiment, reflective material, such as, for purposes of example only and not intended to be limiting, reflective tape may be embedded in a molten or liquid polymer to form collar 102 or cap 104. Other materials that may be employed in making collar 102 or cap 104 reflective include transfer films, high gloss materials, fabrics, inks, reflective lenses, etc., and other reflective materials as known to those of skill in the art.

Cap 104 may be color-coded. Color-coding may be accomplished via various means as known to those of skill in the art, including forming cap 104 from colored materials, such as polymers or plastics with embedded color particles, coating a metal, plastic, or polymer with a colored coating such as a latex or polymer. Color-coding may be used to establish a reference guide to indicate the gallons per minute flow available from the fire hydrant, such as, for instance, the NFPA color coding system described herein. Another possible color coding system uses the colors blue, red, orange, yellow (instead of green) and black, with black indicating the hydrant does not function. Additionally, other methods of marking non functioning hydrants, such as particular shaped collars 102 or caps 104 could also be employed. Particular shaped collars 102 or caps 104 could also be used in association with, or separate from, a color coding system to indicate hydrant pressure. Such a system would establish reference ranges for gallons per minute flow and associate a single, particular color with each range. The colors should be distinct enough from one another to allow for quick, easy identification of the gallons per minute flow associated with the hydrant. However, proprietary systems other than the NFPA coloring may be created and employed as known to those of skill in the art to allow for hydrant classification and identification.

In addition to being color-coded, cap 104 may also include symbols or figures to indicate the gallons per minute flow available from a particular hydrant. This could include alphanumeric designations or other symbol sets wherein a particular hydrant flow rate is associated with a unique symbol combination. In a further embodiment, the symbol designations may be color coded to further enhance visibility as well as to comport with the NFPA coding system.

By color-coding cap 104, changes to hydrant pressure flow may be almost instantly updated by simply changing out one colored cap 104 for a different colored cap 104 that accurately reflects the current pressure flowing from the hydrant. Given the disclosure herein, collar 102, which may be reflective in order to assist fire personnel with visually locating the fire hydrant, can remain in place on the hydrant while cap 104 may be interchanged to reflect changes to hydrant pressure flow. Further, in order to prevent confusion, collar 102 may be free of any of the colors used on cap 104. This allows for collar 102 to remain in place while preventing confusion that may arise by having a color associated with collar 102 that may contradict the color shown by cap 104.

Figure 5A:
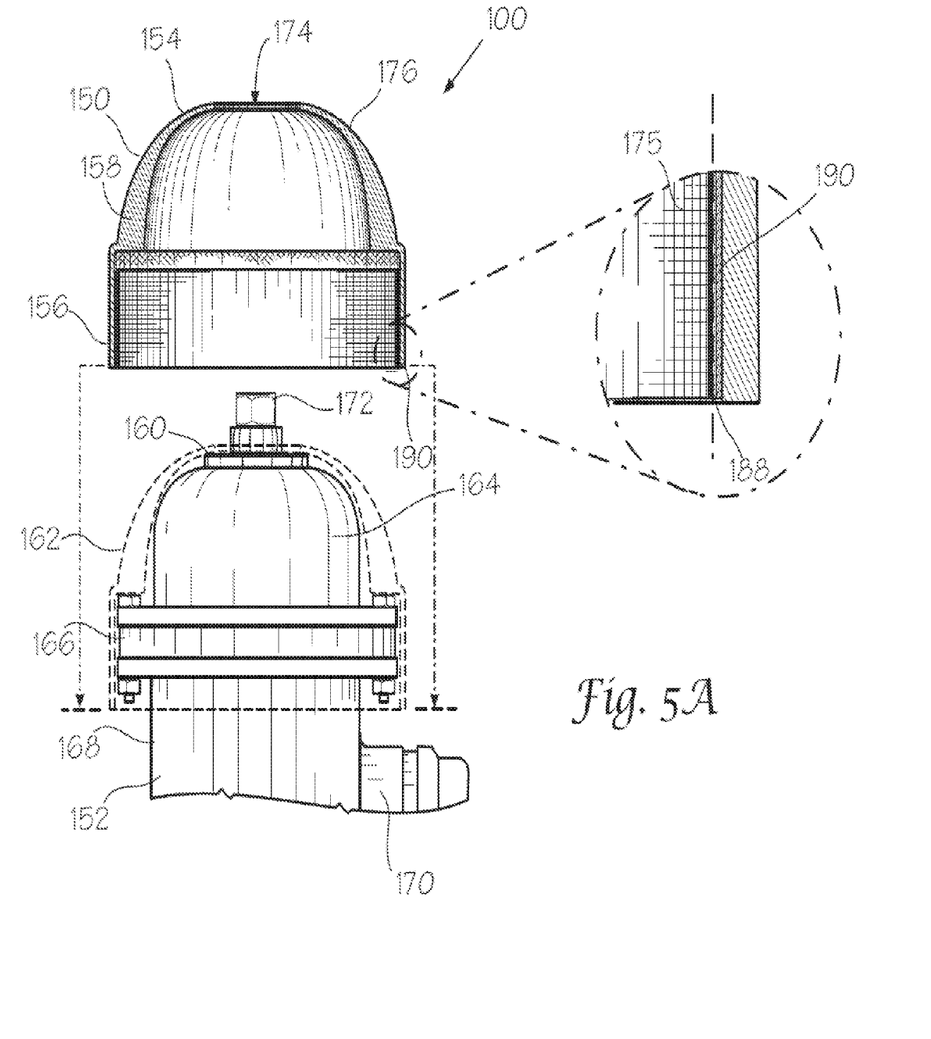
FIG. 5A is a plan and direct view of a further embodiment of the present disclosure showing one possible form of fixation.
Figure 5B:
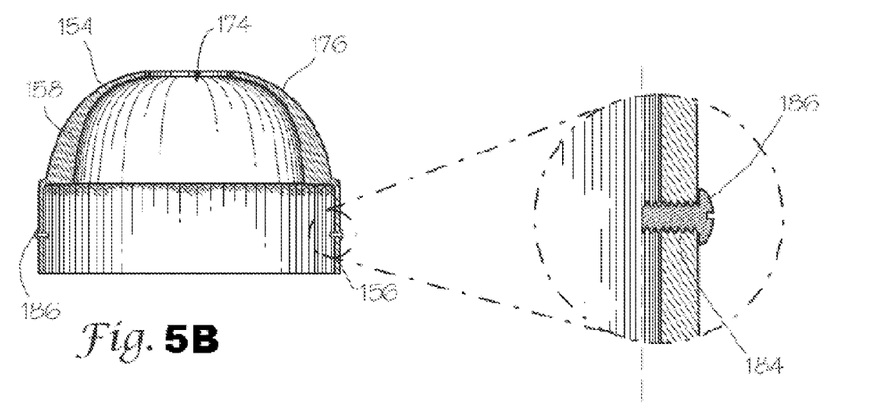
FIG. 5B is a plan and direct view of a further embodiment of the present disclosure showing an alternative form of fixation.
Figure 5C:
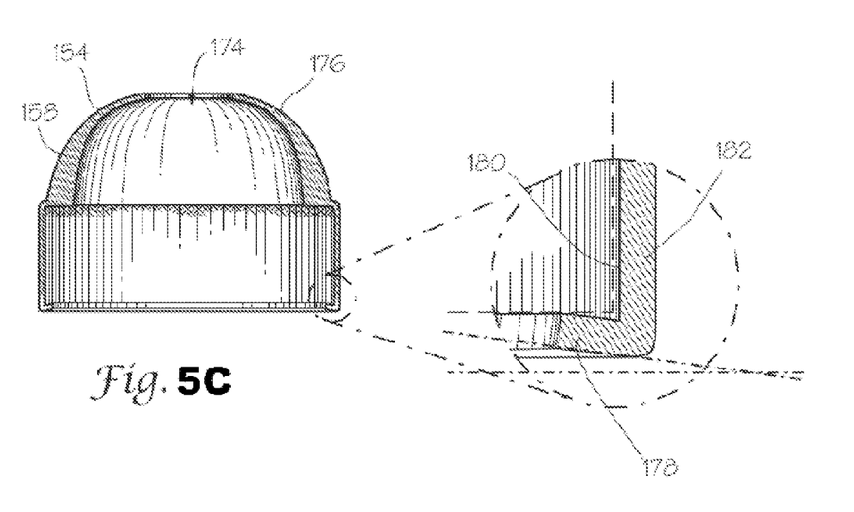
FIG. 5C is a plan and direct view of a further embodiment of the present disclosure showing a further alternative form of fixation.
Figure 6A:
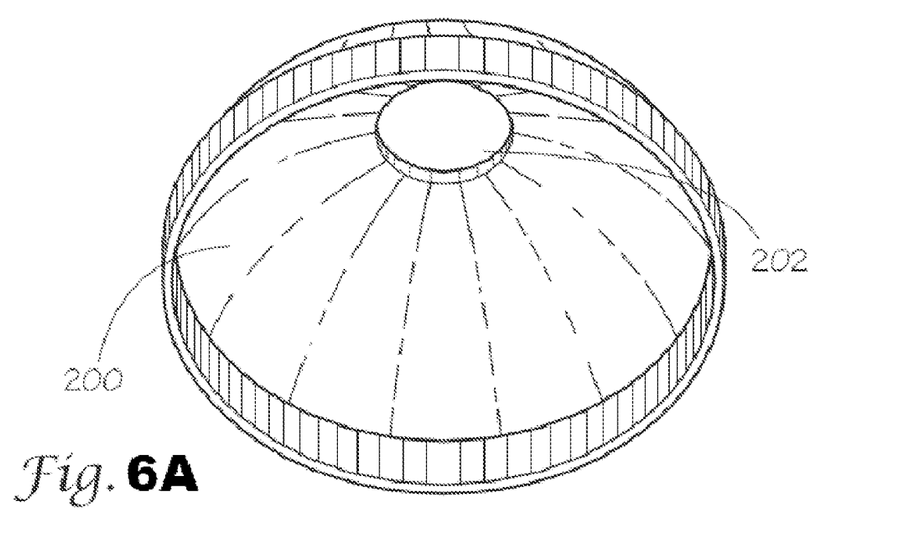
FIG. 6A is a plan view of an interior of an alternate embodiment of the present disclosure.
Figure 6B:
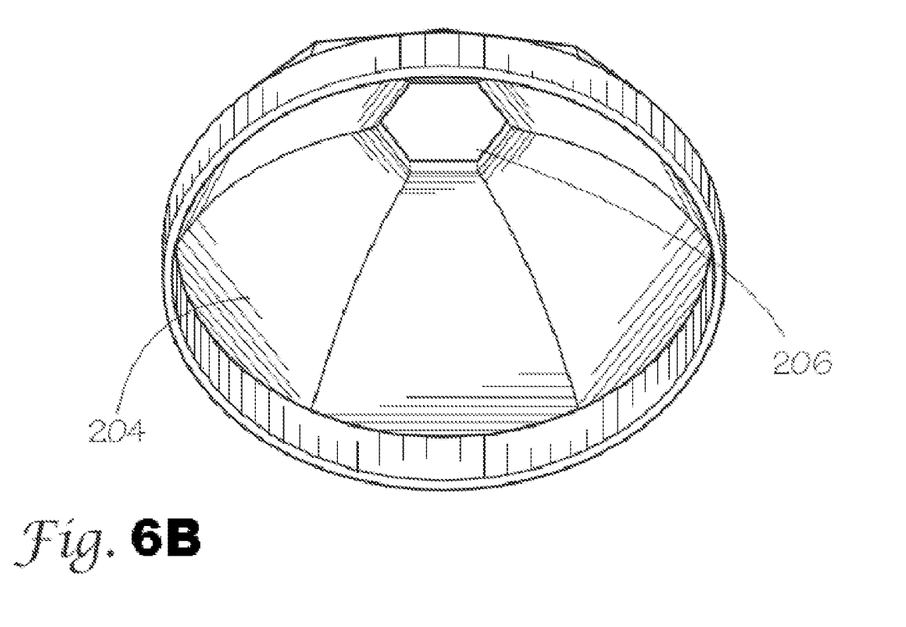
FIG. 6B is a plan view of an interior of a further alternate embodiment of the present disclosure.

In another embodiment, as shown by FIGS. 5A-C, a fire hydrant marking device 150 is provided for interfacing with a fire hydrant 152. Fire hydrant marking device 150 may be formed from a single piece or formed by joining two or more pieces together. In a preferred embodiment, fire hydrant marking device 150 may be formed from a single piece. Marking device 150 includes a cover 154 defining an exterior surface 156 and an interior surface 158 with the cover 154 comprising a cover top 160 and a cover wall 162. Cover top 160 and cover wall 162 are shaped so that interior surface 158 of cover 154 substantially encloses a hydrant cap 164 of the fire hydrant 152. Cover 154 may be formed as a closed "shell" having a continuous inner surface 158. However, in other embodiments, cover 154 may define a plurality of openings 110 so that cover 154 resembles a grid or basket placed over fire hydrant 152. As FIGS. 6A and 6B illustrate, cover 154 may be shaped like a curved bowl 200 and define an opening 202 to accommodate nut 172 of fire hydrant 152, see FIGS. 5A-C. In an alternative embodiment, cover 154 may have a polygon or angled shape 204 that defines an opening 206 to accommodate nut 172.

Referring again to FIGS. 5A-C, Cover wall 162 may also be shaped so that interior surface 158 may extend over a junction 166 between hydrant cap 164 and barrel 168 of fire hydrant 152. Cover wall 162 may also be shaped to terminate proximate to and below junction 166. Cover 154 may be releasably engaged with fire hydrant 152. Cover wall 162 may end flush with junction 166, extend to just below junction 166 or extend beyond junction 166 to surround a portion of barrel 168 below junction 166. However, cover wall 162 should not extend so far down barrel 168 as to interfere with operation of nozzle 170. Preferably, cover wall 162 ends proximate or just below junction 166 in order to provide a compact marking device 150 and to use less materials and save on costs.

Cover wall 162 may be shaped to form a hollow 175 that at least partially covers hydrant cap 164 of fire hydrant 152. Hollow 175 may also be shaped to at least partially enclose and at least partially extend over junction 166 between hydrant cap 164 and barrel 168 of fire hydrant 152. Hollow 175 may also be shaped so that cover wall end 177 of cover wall 162 extends below junction 166 and at least partially surrounds a portion of barrel 168 proximate junction 166.

In a further embodiment, a portion of cover wall 162 comprises a single color that indicates a water pressure associated with the fire hydrant. Still further, a portion of cover wall 162 may be free of the color associated with cover wall 162. Also, a portion of cover wall 162 may reflect light. This may be accomplished as disclosed herein, including but not limited to using reflective paints, reflective tapes, forming cover wall 162 from materials that are naturally reflective, etc.

In a still further embodiment, cover top 160 defines at least one opening 174 proximate a crown 176 of cover top 160 to accommodate nut 172.

Releasably engaging cover 154 to fire hydrant 152 may be accomplished via various methods. For instance, cover wall 162 may including an extending member 178 extending inward from cover wall 162, see FIG. 5C. Extending member 178 may include a solid ring extending inward from cover wall 162 running along the inside perimeter 180 of cover wall 162. Extending member 178 may also comprise multiple independent protruding ledges 182 formed at intervals along inside perimeter 180 of cover wall 162. These ledges may protrude perpendicular from cover wall 162 or form an acute or obtuse angle with cover wall 162, depending on the force desired to remove cover 154 from fire hydrant 152. In one embodiment there is at least one extending ledge 182 extending inward from cover wall 162. In further embodiments, there may be 2, 3, 4, 5, or more ledges 182 extending inward from cover wall 162 and this description should not be considered limiting in this sense. The ring or ledges 182 extending inward from cover wall 162 are placed below junction 166 in order to "grab" when one attempts to pull cover 154 from fire hydrant 152. Cover 154 may be formed of metal, hard plastics, polymers, synthetics, etc., with ledges 182 formed from the same or different materials. Ledges 182 may be imparted with "give" so that one, with effort, could remove cover 154 from fire hydrant 152. Further, ledges 182 may be formed such that they can be moved or bent out of engagement with, or away from, junction 166 in order to allow for removal of cover 154 from fire hydrant 152. For example, ledges 182 may be oriented at an acute angle to inside perimeter 180 of cover wall 162 such that they face toward cover top 160. To remove cover 154, ledges 182 may be pliant enough to bend downward, forming an obtuse angle with inside perimeter 180 and allowing one to remove cover 154, which could then be placed on another hydrant, not shown, and ledges 182 bent again, or naturally reassuming their original position, to reform an acute angle with inside perimeter 180.

Extending member 178 may be formed to allow the cover to slide over hydrant cap 154 and junction 166 with the extending member 178 having final placement located below junction 166. Extending member 178 may contact junction 166 or rest slightly below junction 166 in order to provide a snug fit between marking device 150 and fire hydrant 152 to hold cover 154 in engagement with fire hydrant 152.

Releasable engagement may also be accomplished via defining at least one engagement opening 184 in cover wall 162 and inserting an engagement member 186 through the at least one engagement opening 184, see FIG. 5B. At least one engagement opening 184 is contemplated but greater numbers such as 2, 3, 4, 5, 6, etc., may also be used and the disclosure herein should not be considered limiting in this sense. Engagement member 186 may include screws, such as screws with a proprietary head or formed surface requiring a special tool to remove, bolts, spikes, anchors, barbed anchors, etc., as known to those of skill in the art that would suffice to keep cover 154 in place on fire hydrant 152 but also allow for later removal of the engagement member 186 in order to remove cover 154. In a further embodiment, a synch tie or other means could be passed through engagement openings 184 to allow for affixing cover 154

Releasable engagement may also be accomplished via an affixing means 188, see FIG. 5A. Affixing means could include VELCRO or gecko feet type engagement with a mating member on fire hydrant 152 and an engaging member on the interior of cover wall 162. Another possible affixing means would be a strong but non-permanent adhesive such as an epoxy or curable adhesives wherein chemical or physical treatment create an adhesive that can later be reversed by another chemical or physical treatment, etc. In one embodiment, cover 154 could be adhered to fire hydrant 152 via adhesive 188 using a backing member 190 to support adhesive 188 as well as affix same to insider perimeter 180 of cover wall 162.

Figure 7:
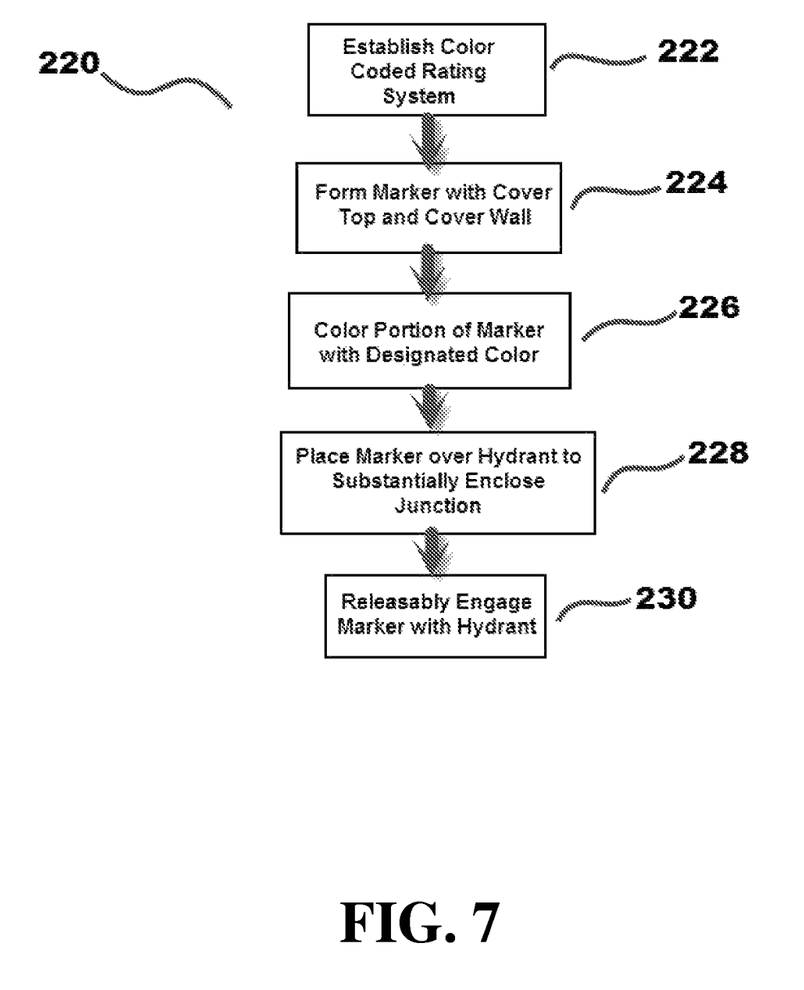
FIG. 7 is a diagram of a method of marking water pressure in fire hydrants.

In a further embodiment, a method of visually indicating the water pressure associated with a fire hydrant 220 is disclosed. A rating system is established 222 wherein different colors are associated with different ranges of gallons per minute flow values of fire hydrants. A hydrant marker is formed 224 and may comprise a cover top and a cover wall. At least a portion of the hydrant marker is colored 226 to display at least one of the colors associated with a gallons per minute flow value. The hydrant cap and junction may be substantially enclosed by the hydrant marker 228. The cover wall of the hydrant marker may terminate proximate to an underside of the junction. The hydrant marker is releasably engaged with the fire hydrant 230.

In a further embodiment, the marker may be lockably engaged to the base element via a locking mechanism, not shown.

The ranges of the present disclosure are provided for illustrative and informative purposes and should not be considered limited to the specified ranges as they may include combinations of the values specified for the above ranges, as well as values falling within these ranges such as, for purposes of example only, 0 to 500 GPM, 500 to 999 GPM, 1,000 to 1,499 GPM, or greater than 1500 GPM. Including 0 to 250, GPM, 250 to 500 GPM, 1500 to 3500 GPM, etc., including specific flow rates such as 500 GPM, 1,200 GPM, 1,800, GPM, 3,000 GPM, etc.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of a combination of one or more of the named components, optionally with one or more other components not specifically named that have essentially the same function.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

The invention claimed is:

1. A fire hydrant cover for interfacing with a fire hydrant, comprising:
   a cover defining an exterior and an interior surface;
   the cover comprising a cover top and a cover wall wherein the cover top and cover wall comprise a single piece construction shaped to slide vertically over a bonnet of a fire hydrant;
   at least one extending member extending inward from the cover wall below a junction of the fire hydrant;
   the cover top and cover wall shaped so that the interior surface of the cover substantially encloses a hydrant cap of the fire hydrant;
   the cover wall shaped so that the interior surface extends over a junction between the hydrant cap and a barrel of the fire hydrant;
   the cover wall shaped to terminate proximate to and below the junction;
   and
   wherein the cover is releasably engaged with the fire hydrant.

2. The fire hydrant cover of claim 1, wherein a portion of the cover comprises a single color that indicates a flow rate associated with the fire hydrant.

3. The fire hydrant cover of claim 2, wherein a portion of the cover is free of the color associated with the cover.

4. The fire hydrant cover of claim 1, wherein a portion of the cover reflects light.

5. The fire hydrant cover of claim 1, wherein the cover further comprises:
   the top defining at least one opening proximate a crown of the top.

6. The fire hydrant cover of claim 1, wherein the extending member engages an underside of the junction of the fire hydrant and holds the cover in engagement with the fire hydrant.

7. The fire hydrant cover of claim 1, wherein the cover wall is a releaseable engagement cover and includes at least one engagement opening and at least one engagement member inserted in at least one engagement opening.

8. The fire hydrant cover of claim 1, wherein an interior surface of the cover wall includes an adhesive.

9. The fire hydrant cover of claim 1, wherein the cover top defines an opening shaped such that only a nut of the fire hydrant protrudes through the opening.

10. The fire hydrant cover of claim 1, wherein the at least one extending member comprises multiple ledges extending inward from the cover wall.

11. A method of visually indicating the flow rate associated with a fire hydrant, comprising:
   establishing a rating system wherein different colors are associated with different ranges of gallons per minute flow rate of fire hydrants;
   forming a hydrant marker comprising a cover top and a cover wall and at least one extending member, wherein the cover top, cover wall, and at least one extending member comprise a single piece construction shaped to slide vertically over a bonnet of a fire hydrant, the at least one extending member extends inward from the cover wall and is positioned underneath a fire hydrant junction located on the hydrant;
   coloring at least a portion of the hydrant marker to display at least one of the colors associated with a gallons per minute flow rate;
   substantially enclosing a hydrant cap and a junction of the fire hydrant with the hydrant marker;
   terminating the cover wall proximate an underside of the junction;
   and
   releasably engaging the hydrant marker with the fire hydrant.

12. The method of claim 11, wherein releasable engagement is accomplished by the extending member located on an interior of the cover wall.

13. The method of claim 11, wherein releasable engagement is accomplished via defining at least one engagement opening in the cover wall and inserting an engagement member through the at least one engagement opening.

14. The method of claim 11, wherein releasable engagement is accomplished via applying an adhesive to an interior surface of the cover wall.

15. A marker for indicating fire hydrant flow rate, comprising:
   a cover shell;
   the cover shell comprising at least one opening and a cover wall wherein the cover wall comprises a single piece construction shaped to slide vertically over a top of a fire hydrant;
   at least one extending member extending inward from the cover wall positioned below a fire hydrant junction located on the hydrant;
   the cover wall shaped to form a hollow that at least partially covers a hydrant cap of a fire hydrant;
   the cover wall hollow further shaped to at least partially enclose and at least partially extend over a junction between the hydrant cap and a barrel of the fire hydrant;
   the cover wall hollow shaped so that the cover wall extends below the junction and at least partially surrounds a portion of the fire hydrant barrel proximate the junction; and
   wherein the cover wall is releasably secured to the fire hydrant.

16. The fire hydrant marking device of claim 15, wherein a portion of the cover shell comprises a single color that indicates a flow rate associated with the fire hydrant.

17. The fire hydrant marking device of claim 15, wherein the cover wall is a releaseable engagement cover wall and includes the extending member located on an interior of the cover wall.

18. The fire hydrant marking device of claim 15, wherein the indicator wall is a releaseable engagement indicator wall and includes at least one engagement opening and at least one engagement member inserted in at least one engagement opening.

19. The fire hydrant marking device of claim 15, wherein an interior surface of the indicator wall includes an adhesive.

20. The fire hydrant cover of claim 15, wherein the at least one extending member comprises multiple ledges extending inward from the cover wall.

* * * * *